(12) United States Patent
Komano et al.

(10) Patent No.: US 10,255,428 B2
(45) Date of Patent: Apr. 9, 2019

(54) APPARATUS AND METHOD FOR TESTING NORMALITY OF SHARED DATA

(71) Applicant: Kabushiki Kaisha Toshiba, Minato-ku (JP)

(72) Inventors: Yuichi Komano, Yokohama (JP); Takeshi Kawabata, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 199 days.

(21) Appl. No.: 15/262,162

(22) Filed: Sep. 12, 2016

(65) Prior Publication Data
US 2017/0139795 A1 May 18, 2017

(30) Foreign Application Priority Data
Nov. 13, 2015 (JP) .................... 2015-223105

(51) Int. Cl.
| | |
|---|---|
| *G06F 11/00* | (2006.01) |
| *G06F 21/44* | (2013.01) |
| *G06F 21/00* | (2013.01) |
| *G06F 21/57* | (2013.01) |
| *H04L 9/32* | (2006.01) |
| *H04L 29/06* | (2006.01) |
| *H04L 12/26* | (2006.01) |

(Continued)

(52) U.S. Cl.
CPC .............. *G06F 21/44* (2013.01); *G06F 21/00* (2013.01); *G06F 21/57* (2013.01); *H04L 9/3278* (2013.01); *H04L 43/50* (2013.01); *H04L 63/08* (2013.01); *H04L 63/1425* (2013.01); *G06F 2221/2129* (2013.01); *H04L 43/16* (2013.01); *H04L 63/0435* (2013.01); *H04L 63/065* (2013.01); *H04L 67/12* (2013.01); *H04L 2012/40215* (2013.01); *H04L 2012/40273* (2013.01); *H04L 2209/84* (2013.01)

(58) Field of Classification Search
CPC .. G06F 11/263; G06F 11/273; G06F 11/2733; G06F 11/2736; H04L 63/0435
See application file for complete search history.

(56) References Cited

U.S. PATENT DOCUMENTS

| | | | |
|---|---|---|---|
| 7,602,915 B2 | 10/2009 | Iwamura | |
| 8,081,643 B2 * | 12/2011 | Sonoda | ............... H04L 12/4625 370/401 |

(Continued)

FOREIGN PATENT DOCUMENTS

| | | |
|---|---|---|
| JP | 2005-341528 A | 12/2005 |
| JP | 2006-222800 A | 8/2006 |

(Continued)

*Primary Examiner* — Elmira Mehrmanesh
(74) *Attorney, Agent, or Firm* — Oblon, McClelland, Maier & Neustadt, L.L.P.

(57) ABSTRACT

According to an embodiment, a test apparatus that is connected to an electronic device through a network includes a generator, a transmitter, and a determination unit. The generator generates third data computed from first data shared with the electronic device and predetermined second data. The transmitter transmits the third data to the electronic device. The determination unit determines whether the first data of the electronic device is normal depending on whether the second data is restored correctly from the third data using the first data of the electronic device.

9 Claims, 8 Drawing Sheets

(51) Int. Cl.
*H04L 12/40* (2006.01)
*H04L 29/08* (2006.01)

(56) References Cited

U.S. PATENT DOCUMENTS

| | | | | |
|---|---|---|---|---|
| 9,374,355 | B2* | 6/2016 | Schwarz | H04L 63/12 |
| 2003/0009271 | A1* | 1/2003 | Akiyama | G06F 21/335 |
| | | | | 701/29.6 |
| 2006/0115085 | A1* | 6/2006 | Iwamura | H04L 9/0822 |
| | | | | 380/259 |
| 2009/0249014 | A1* | 10/2009 | Obereiner | G06F 12/1441 |
| | | | | 711/164 |
| 2010/0250936 | A1* | 9/2010 | Kusakawa | H04L 9/3278 |
| | | | | 713/169 |
| 2011/0083161 | A1* | 4/2011 | Ishida | H04L 12/40 |
| | | | | 726/2 |
| 2013/0173112 | A1* | 7/2013 | Takahashi | H04L 9/0894 |
| | | | | 701/36 |
| 2013/0230173 | A1 | 9/2013 | Hori | |
| 2013/0262192 | A1* | 10/2013 | McCarty | G06Q 10/06395 |
| | | | | 705/7.41 |
| 2014/0089685 | A1* | 3/2014 | Suzuki | H04L 9/0866 |
| | | | | 713/193 |
| 2014/0317729 | A1* | 10/2014 | Naitou | H04L 63/0428 |
| | | | | 726/21 |
| 2016/0056953 | A1 | 2/2016 | Komano et al. | |
| 2016/0211974 | A1 | 7/2016 | Komano et al. | |

FOREIGN PATENT DOCUMENTS

| | | |
|---|---|---|
| JP | 2008-5396 A | 1/2008 |
| JP | 2010-241298 A | 10/2010 |
| JP | 2013-138304 A | 7/2013 |
| JP | 2013-225875 A | 10/2013 |
| JP | 5772692 B2 | 9/2015 |
| JP | 2016-46719 A | 4/2016 |
| JP | 2016-92716 A | 5/2016 |
| JP | 2016-134671 A | 7/2016 |

* cited by examiner

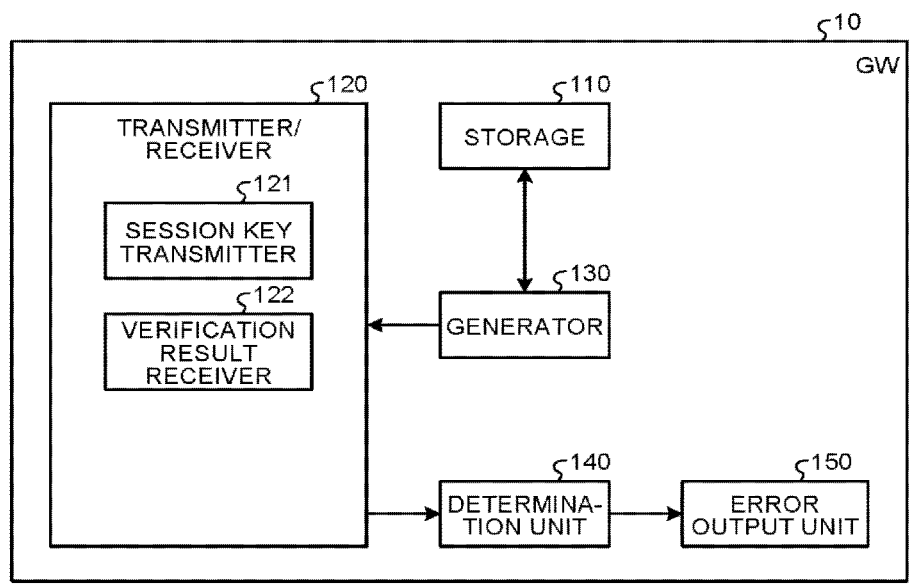

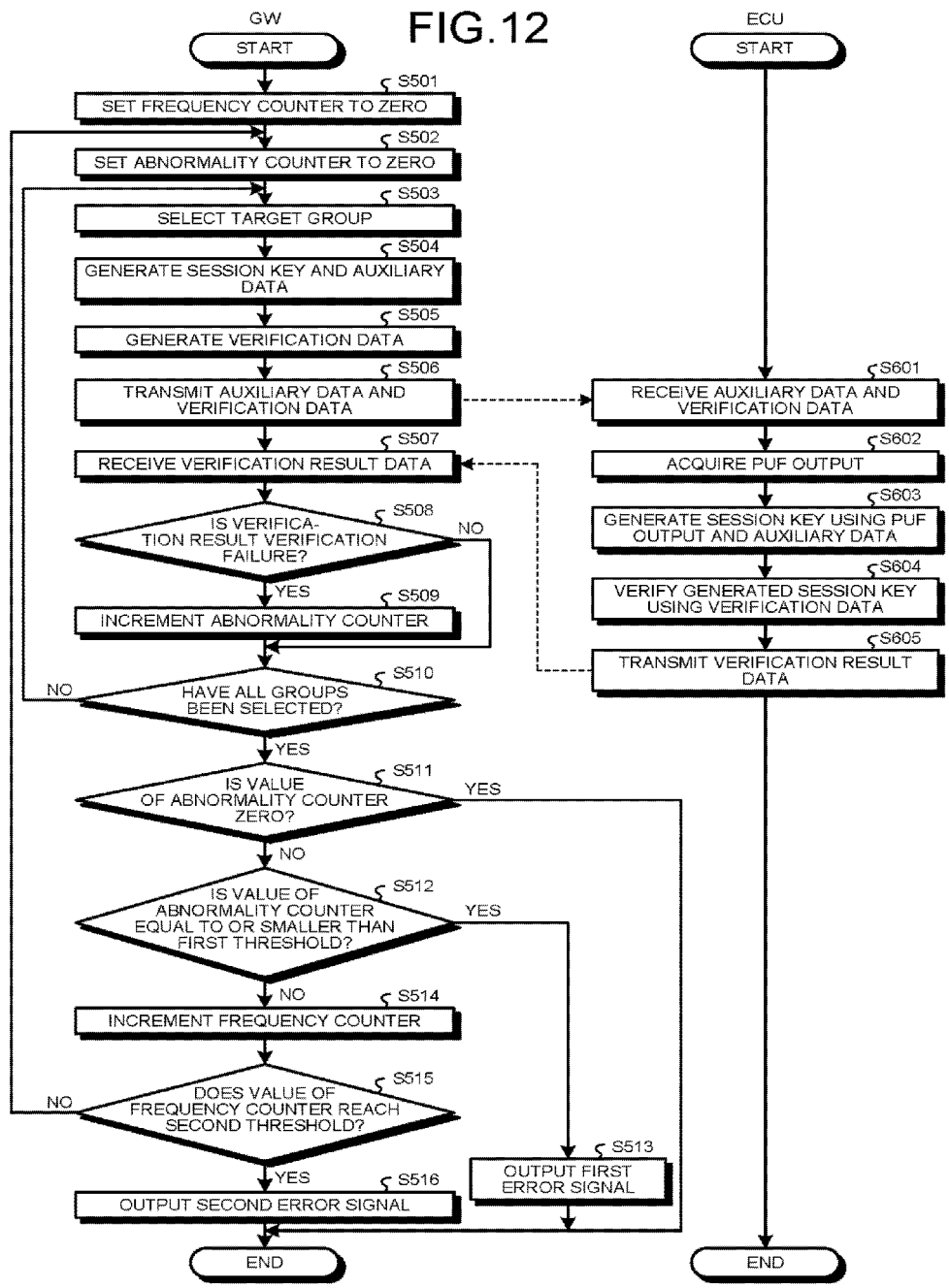

APPARATUS AND METHOD FOR TESTING NORMALITY OF SHARED DATA

CROSS-REFERENCE TO RELATED APPLICATIONS

This application is based upon and claims the benefit of priority from Japanese Patent Application No. 2015-223105, filed on Nov. 13, 2015; the entire contents of which are incorporated herein by reference.

FIELD

Embodiments described herein relate generally to a test apparatus, a communication system, a moving object, and a test method.

BACKGROUND

For example, moving objects such as automobiles are equipped with various electronic control units (ECUs) for controlling various types of devices. These ECUs are connected to, for example, a network such as a controller area network (CAN) to control the automobile while transmitting/receiving signals through the network.

In a network that electronic devices such as ECUs are connected to, ensuring the validity of communication is extremely important in order to prevent wrong control. In order to ensure the validity of communication, the use of encryption techniques is effective. For example, if electronic devices performing communication share data such as shared encryption keys correctly, this data can be used to authenticate communication, conceal contents of communication, and detect tampering.

Unfortunately, electronic devices mounted on moving objects such as automobiles, in particular, are often exposed to severe use environment, which may cause corruption of shared data such as encryption keys stored in the electronic devices. The corruption of the shared data stored in the electronic devices may make it impossible to ensure the validity of communication. It is therefore required to enable the shared data stored in electronic devices to be appropriately tested.

BRIEF DESCRIPTION OF THE DRAWINGS

FIG. 3 is a block diagram illustrating a functional configuration example of the GW in a first embodiment;

FIG. 4 is a diagram illustrating an example of group management information;

FIG. 12 is a flowchart illustrating an example of the processing procedure in the third embodiment.

DETAILED DESCRIPTION

According to an embodiment, a test apparatus that is connected to an electronic device through a network includes a generator, a transmitter, and a determination unit. The generator generates third data computed from first data shared with the electronic device and predetermined second data. The transmitter transmits the third data to the electronic device. The determination unit determines whether the first data of the electronic device is normal depending on whether the second data is restored correctly from the third data using the first data of the electronic device.

A test apparatus of embodiments is applicable to, for example, a vehicle-mounted network system (communication system) mounted on an automobile as an example of moving objects. In the following description, a vehicle-mounted gateway apparatus (hereinafter abbreviated as "GW") included in the vehicle-mounted network system is configured as the test apparatus of embodiments. Apparatuses or systems that embodiments are applicable to are not limited to the examples below. The test apparatus of embodiments is widely applicable in various communication systems that require the validity of communication to be ensured using data such as encryption keys shared between senders and receivers in communication.

First Embodiment

Figure 1:
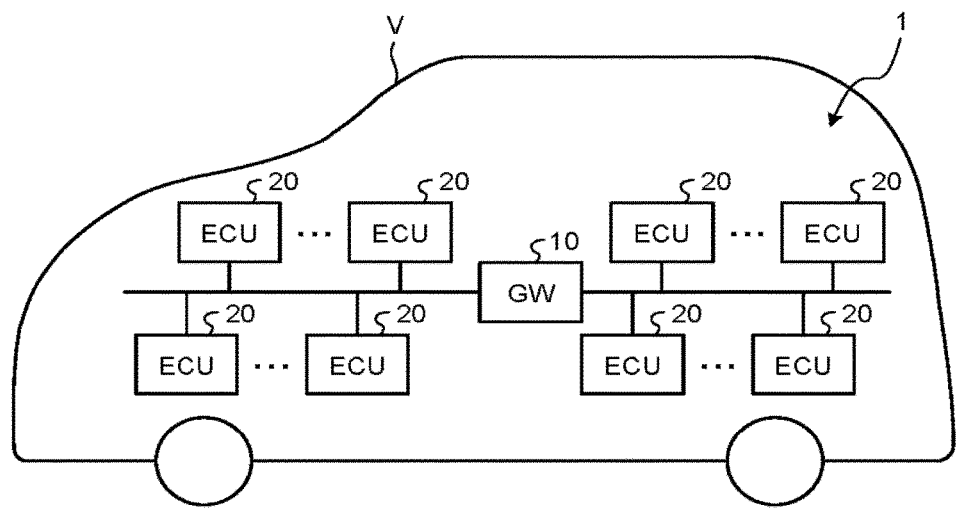
FIG. 1 is a schematic diagram illustrating an overview of a vehicle-mounted network system.

FIG. 1 is a schematic diagram illustrating an overview of a vehicle-mounted network system 1. As illustrated in FIG. 1, the vehicle-mounted network system 1 is configured such that a GW 10 configured as a test apparatus is connected with a variety of ECUs 20 as electronic devices mounted on an automobile V via a network. The GW 10 in the present embodiment has original functions as a gateway, such as relaying communication between subnetworks in the vehicle-mounted network system 1 and relaying communication between the vehicle-mounted network system 1 and an external network, and additionally has the function of testing a pre-shared key shared between the communicating ECUs 20. The vehicle-mounted network system 1 can use communication standards known as vehicle-mounted network standards, for example, such as a CAN and FlexRay (registered trademark).

When a plurality of ECUs 20 cooperate to control the automobile V, these ECUs 20 transmit/receive a control signal through communication via the network. As used herein, a control signal collectively refers to a signal transmitted/received between ECUs 20 for controlling the automobile V. When a control signal is transmitted/received between ECUs 20, the validity of communication between ECUs 20 should be ensured in order to prevent wrong control. There are various ways to ensure the validity of communication. For example, since communication between ECUs 20 during running of the automobile V requires real-time operation, the processing for ensuring the validity of communication must not take time. The present embodiment therefore uses an authentication technique with message authentication code (MAC) capable of authenticating communication in a short time to ensure the validity of communication between ECUs 20.

The MAC authentication technique uses a pre-shared key shared between a sender and a receiver or a session key derived from a pre-shared key in order to derive a MAC value required for authentication. In the present embodiment, for example, when the GW 10 distributes a session key to be used for deriving a MAC value to each of the communicating ECUs 20, the GW 10 tests the pre-shared key shared between the communicating ECUs 20.

The ECUs 20 connected to the network as nodes of the vehicle-mounted network system 1 can be grouped according to the kinds of control signals to be transmitted and received, for example, into a group of ECUs 20 transmitting or receiving control signals related to braking and a group of ECUs 20 transmitting or receiving control signals related to vehicle speed. As used herein, a group means a conceptual classification according to the kinds of control signals to be transmitted and received. A control signal transmitted on the network is transmitted or received by an ECU 20 that belongs to the group corresponding to the control signal, and is neither transmitted nor received by an ECU 20 that does not belong to the group. When one ECU 20 transmits or receives different kinds of control signals, that ECU 20 may belong to a plurality of groups. A plurality of ECUs 20 transmitting or receiving different kinds of control signals may be classified into one group.

In the vehicle-mounted network system 1 of the present embodiment, ECUs 20 belonging to the same group share the same pre-shared key. For example, the pre-shared key may be set in each ECU 20 by a worker during assembly or shipment of the automobile V equipped with the vehicle-mounted network system 1 or may be distributed to each ECU 20 by the GW 10 through the network. The GW 10 manages a pre-shared key set for each group of these ECUs 20. That is, the GW 10 shares a pre-shared key with each ECU 20. At a timing when the automobile V is shipped and actually starts running, for example, when the ignition switch of the automobile V is turned on, the GW 10 distributes a session key derived from the pre-shared key for each group to each ECU 20. In doing so, the GW 10 tests the pre-shared key stored in each ECU 20, through distribution of the session key. If an ECU 20 having the pre-shared key determined to be abnormal is found, the GW 10 outputs an error signal to promote appropriate action.

In the present embodiment, the pre-shared key for each group managed by the GW 10 corresponds to "first data", the session key distributed by the GW 10 to each ECU 20 corresponds to "second data", and encrypted data obtained by encrypting the session key using the pre-shared key corresponds to "third data".

Figure 2:
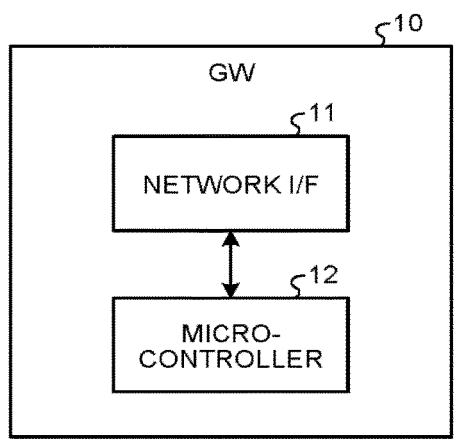
FIG. 2 is a block diagram illustrating a hardware configuration example of a GW.

FIG. 2 is a block diagram illustrating a hardware configuration example of the GW 10. As illustrated in FIG. 2, the GW 10 includes, for example, a network interface (I/F) 11 and a microcontroller 12. The network I/F 11 is an interface for connecting the GW 10 to a network. The microcontroller 12 is a computer system built in as an integrated circuit and executes various control under instructions of a program (software) running on the computer system. The microcontroller 12 executes control under instructions of the program while using the network I/F 11, whereby the GW 10 implements a variety of functions related to testing of the pre-shared key.

FIG. 3 is a block diagram illustrating a functional configuration example of the GW 10 in the present embodiment. As illustrated in FIG. 3, the GW 10 of the present embodiment includes, for example, a storage 110, a transmitter/receiver 120, a generator 130, a determination unit 140, and an error output unit 150 as functional components related to testing of the pre-shared key.

The storage 110 stores group management information. The group management information is information for managing a pre-shared key set for each group of ECUs 20 mentioned above. FIG. 4 is a diagram illustrating an example of the group management information stored in the storage 110. This group management information 30 in FIG. 4 stores a set of device IDs allocated to the respective ECUs 20 belonging to a group and a pre-shared key set for the group, in association with the group ID allocated to the group. When the pre-shared key is to be updated, a new pre-shared key is distributed to the ECUs 20 belonging to the group, and the pre-shared key in the group management information 30 is rewritten with the new pre-shared key.

The transmitter/receiver 120 is a module to allow the GW 10 to communicate with ECUs 20 through a network and includes a session key transmitter 121 and a verification result receiver 122 as submodules.

The session key transmitter 121 transmits encrypted data (data obtained by encrypting the session key with the pre-shared key) generated by the generator 130 described later and verification data for verifying the correctness of the session key restored by the ECU 20 decrypting the encrypted data using the pre-shared key, to each ECU 20 on a group-by-group basis. For example, the session key transmitter 121 repeats broadcasting of encrypted data and verification data with addition of a group ID onto the network, the number of times corresponding to the number of groups. Each ECU 20 connected to the network receives encrypted data and verification data if the group ID added to the encrypted data and the verification data transmitted by the session key transmitter 121 of the GW 10 is the one corresponding to the group that the ECU 20 belongs to.

The data added by the session key transmitter 121 to the encrypted data and the verification data is not limited to a group ID and may be any data by which the ECU 20 can determine whether to receive the encrypted data and the verification data broadcasted onto the network. For example, in place of a group ID, a control signal transmitted/received between ECUs 20 belonging to a group may be added, or a set of device IDs of ECUs 20 belonging to a group may be added. The encrypted data and the verification data are not necessarily transmitted simultaneously, and the encrypted data and the verification data may be transmitted at different timings.

The verification result receiver 122 receives verification result data from each ECU 20 to indicate the result of verification of the correctness of the session key by the ECU 20 using the verification data. The verification result data has two values: Verification Success indicating that the restored session key is correct; and Verification Failure indicating that the restored session key is not correct.

The generator 130 generates a session key to be distributed to ECUs 20 by the GW 10. The generator 130 also generates encrypted data by encrypting the generated session key using the pre-shared key set for the group of ECUs 20 (hereinafter referred to as "target group") to which the session key is to be distributed. The generator 130 also generates verification data for verifying the correctness of the session key restored by the ECU 20 decrypting the encrypted data using the pre-shared key. The encrypted data and the verification data generated by the generator 130 are transmitted from the session key transmitter 121 to each ECU 20.

As verification data, the hash value of the session key or the value obtained by encrypting a predetermined value stored in both the GW 10 and the ECU 20 with the session key can be used. When the hash value of the session key is used as verification data, the ECU 20 calculates the hash value of the session key restored by decrypting the encrypted data using the pre-shared key stored in the ECU 20 itself and determines whether the calculated hash value is equal to the hash value transmitted from the GW 10 to verify whether the restored session key is correct. When the value obtained by encrypting a predetermined value with the session key is used as verification data, the ECU 20 encrypts a predetermined value using the session key restored by decrypting the encrypted data using the pre-shared key stored in the ECU 20 itself and determines whether the obtained value is equal to the value transmitted from the GW 10 to verify whether the restored session key is correct.

The determination unit 140 determines whether the pre-shared key stored in an ECU 20 is normal, based on the verification result data received by the verification result receiver 122 from the ECU 20. That is, if the verification result data received by the verification result receiver 122 from an ECU 20 is Verification Success, the determination unit 140 determines that the pre-shared key stored in this ECU 20 is normal. On the other hand, if the verification result data received by the verification result receiver 122 from an ECU 20 is Verification Failure, the determination unit 140 determines that the pre-shared key stored in this ECU 20 is abnormal.

The verification result data received by the verification result receiver 122 from an ECU 20 indicates the verification result as to whether the session key restored by the ECU 20 decrypting the encrypted data using the pre-shared key stored in the ECU 20 itself is correct, as described above. Here, if the pre-shared key stored in the ECU 20 is normal, the session key can be restored correctly using this pre-shared key, and therefore the verification result data is Verification Success. On the other hand, if the pre-shared key stored in the ECU 20 has abnormality, in spite of the attempt to restore the session key using this pre-shared key, the session key is unable to be restored correctly, and therefore the verification result data is Verification Failure. Accordingly, whether the pre-shared key stored in an ECU 20 is normal is determined based on whether the verification result data is Verification Success or Verification Failure. In this way, the present embodiment is configured such that whether the pre-shared key stored in an ECU 20 is normal is determined depending on whether the verification result data received from the ECU 20 is Verification Success or Verification Failure, that is, whether the session key distributed to the ECU 20 has been restored correctly in the ECU 20.

Preferably, the determination unit 140 determines whether the number of ECUs 20 having the pre-shared key determined to be abnormal is equal to or smaller than a predetermined first threshold, as a result of the testing of the pre-shared key as described above for each of the ECUs 20 connected as nodes of the vehicle-mounted network system 1. This first threshold is a threshold for distinguishing whether abnormality of the pre-shared key occurs in a small number of ECUs 20 in a limited extent or occurs in a wide range. If abnormality of the pre-shared key occurs in a small number of ECUs 20 in a limited extent, it can be determined that the abnormality occurs on the ECU 20 side. If abnormality occurs in a wide range, it may be expected that the session key fails to be restored correctly on the ECU 20 side due to abnormality on the GW 10 side or a temporary failure of the network. The determination unit 140 determines whether the number of ECUs 20 having the pre-shared key determined to be abnormal is equal to or smaller than the first threshold, thereby correctly determining whether abnormality occurs on the ECU 20 side.

In this case, the determination unit 140 counts the number of ECUs 20 having the pre-shared key determined to be abnormal, for example, using an abnormality counter temporarily stored in the storage 110 or the like. That is, the determination unit 140 first sets the abnormality counter held in the storage 110 to zero when starting testing of the pre-shared key for an ECU 20 and increments the abnormality counter (+1) every time when the verification result receiver 122 receives the verification result data indicating Verification Failure. Then, for example, after the verification result receiver 122 receives verification result data from all of the ECUs 20, the determination unit 140 refers to the value of the abnormality counter held in the storage 110 and compares the counter value with the first threshold to determine whether the number of ECUs 20 having the pre-shared key determined to be abnormal is equal to or smaller than the first threshold.

The error output unit 150 outputs an error signal if the determination unit 140 determines that the pre-shared key stored in an ECU 20 is abnormal. The error output unit 150 can output the error signal, for example, to a display panel provided in the automobile V. In this case, the display panel displays, for example, an error message indicating that any of the ECUs 20 in the automobile V is unable to communicate normally, based on the error signal input from the error output unit 150. This message can notify, for example, the driver of the automobile V of abnormality and prompt the driver to take appropriate action. Information for specifying the ECU 20 having abnormality, such as the device ID of the ECU 20 having abnormality or the group ID of the group that this ECU 20 belongs to, may be added to the error signal, so that information as to which ECU 20 in the automobile V has abnormality or the ECU 20 of which group has abnormality is additionally displayed on the display panel.

The error output unit 150 may output the error signal to an alarm indicator provided in the automobile V. In this case, the alarm indicator allows a light source to illuminate or flash on and off, based on the error signal input from the error output unit 150. This alarm indicator notifies, for example, the driver of the automobile V of abnormality and prompts the driver to take appropriate action.

The error output unit 150 may be configured to output the error signal to a maintenance tool connected to the GW 10 through an external input/output terminal of the GW 10 or the vehicle-mounted network system 1. That is, when the session key is distributed by the GW 10 in a state in which the maintenance tool used by a maintenance worker is connected to the GW 10, for example, during maintenance of the automobile V, the error output unit 150 outputs the error signal to the maintenance tool. In this case, the maintenance tool displays, for example, an error message indicating that any of the ECUs 20 in the automobile V is unable to communicate normally, or information as to which ECU 20 in the automobile V has abnormality or the ECU 20 of which group has abnormality, based on the error signal input from the error output unit 150. This error message can notify the maintenance worker who performs maintenance of the automobile V of abnormality of the ECU 20 and prompt the worker to take appropriate action.

In the case where the determination unit 140 is configured to determine whether the number of ECUs 20 having the pre-shared key determined to be abnormal is equal to or smaller than the first threshold, the error output unit 150 outputs a first error signal if the number of ECUs 20 having the pre-shared key determined to be abnormal is equal to or smaller than the first threshold. The error output unit 150 outputs a second error signal if the number of ECUs 20 having the pre-shared key determined to be abnormal exceeds the first threshold. Here, the first error signal is an error signal indicating that the ECU 20 side has abnormality, and the second error signal is an error signal indicating that, for example, the GW 10 or the network other than the ECU 20 has abnormality.

When the determination unit 140 determines that the number of ECUs 20 having the pre-shared key determined to be abnormal exceeds the first threshold, the error output unit 150 preferably instructs the transmitter/receiver 120, the generator 130, and the determination unit 140 to retry the aforementioned testing of the pre-shared key for each ECU 20, rather than immediately outputting a second error signal. Preferably, the retry is repeated until the number of times the number of ECUs 20 having the pre-shared key determined to be abnormal exceeds the first threshold reaches a predetermined second threshold. When the number of times the number of ECUs 20 having the pre-shared key determined to be abnormal exceeds the first threshold reaches the second threshold, the second error signal is output. This second threshold is for eliminating the effect of testing failures due to a temporary failure of the network. That is, when the number of ECUs 20 having the pre-shared key determined to be abnormal repeatedly exceeds the first threshold in spite of the retry, it can be determined that the abnormality is not attributed to a temporal failure of the network.

In this case, the error output unit 150 counts the number of times the number of ECUs 20 having the pre-shared key determined to be abnormal exceeds the first threshold, for example, using a frequency counter temporarily stored in the storage 110 or the like. That is, the error output unit 150 first sets the frequency counter held in the storage 110 to zero when starting testing of the pre-shared key for an ECU 20. The error output unit 150 then increments the value of the frequency counter (+1) every time when it is determined that the number of ECUs 20 having the pre-shared key determined to be abnormal exceeds the first threshold, and compares the value of the incremented frequency counter with the second threshold to determine whether the number of times the number of ECUs 20 having the pre-shared key determined to be abnormal exceeds the first threshold reaches the second threshold.

Figure 5:
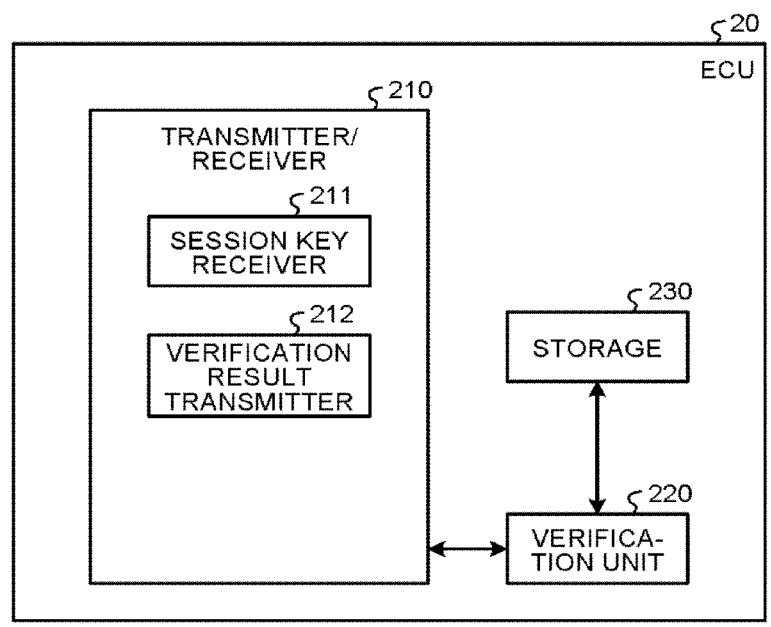
FIG. 5 is a block diagram illustrating a functional configuration example of an ECU in the first embodiment.

An overview of the ECU 20 of the present embodiment will now be described. FIG. 5 is a block diagram illustrating a functional configuration example of the ECU 20 of the present embodiment. As illustrated in FIG. 5, the ECU 20 of the present embodiment includes, for example, a transmitter/receiver 210, a verification unit 220, and a storage 230 as functional components related to testing of the pre-shared key.

The transmitter/receiver 210 is a module to allow the ECU 20 to communicate with the GW 10 through a network and includes a session key receiver 211 and a verification result transmitter 212 as submodules.

The session key receiver 211 receives encrypted data and verification data if the group ID added to the encrypted data and the verification data transmitted by the session key transmitter 121 of the GW 10 corresponds to the group that the ECU 20 in question belongs to. In the case where a control signal is added to encrypted data and verification data, the session key receiver 211 receives the encrypted data and the verification data if the control signal is a control signal to be transmitted and received by the ECU 20 in question to/from another ECU 20. In the case where a set of device IDs is added to encrypted data and verification data, the session key receiver 211 receives the encrypted data and the verification data if the set of device IDs includes the device ID allocated to the ECU 20 in question.

The verification result transmitter 212 transmits verification result data indicating the result of verification by the verification unit 220, that is, Verification Success indicating that the restored session key is correct or Verification Failure indicating that the restored session key is not correct, to the GW 10.

The verification unit 220 decrypts the encrypted data received by the session key receiver 211 using the pre-shared key stored in the storage 230 to restore the session key distributed by the GW 10. The verification unit 220 then verifies whether the restored session key is correct, using the verification data received by the session key receiver 211. If the restored session key is correct, the verification unit 220 stores the restored session key into the storage 230. The verification unit 220 also notifies the transmitter/receiver 210 of the result of verification of the correctness of the session key. The verification result data indicating the result of verification by the verification unit 220 is thus transmitted from the verification result transmitter 212 to the GW 10.

The storage 230 stores the pre-shared key, the session key, and others distributed from the GW 10. In updating of the pre-shared key and/or the session key, the pre-shared key and/or the session key stored in the storage 230 is rewritten with a pre-shared key and/or session key newly distributed from the GW 10.

Figure 6:
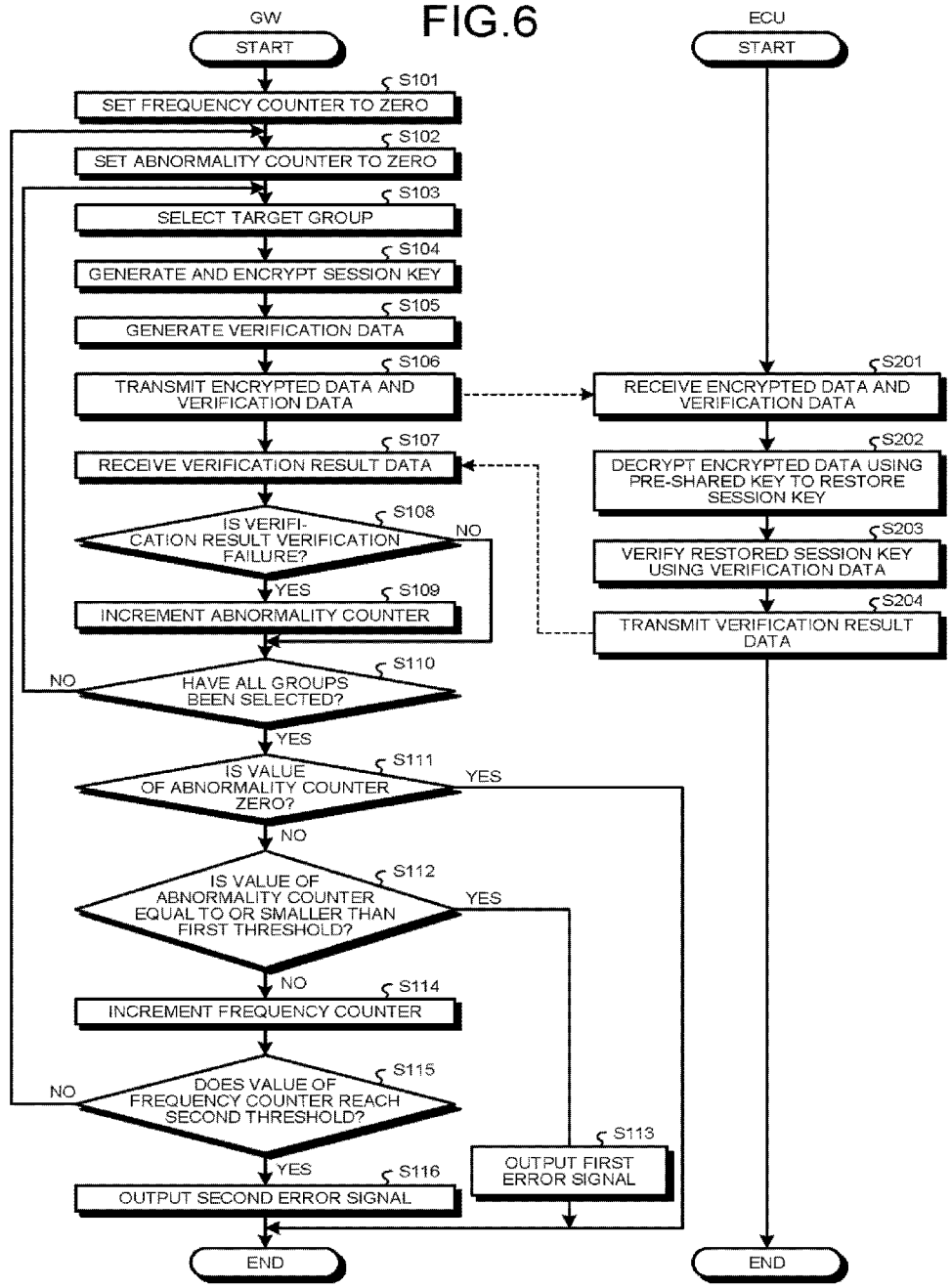
FIG. 6 is a flowchart illustrating an example of the processing procedure in the first embodiment.

Referring now to FIG. 6, an operational example of the GW 10 and the ECU 20 related to testing of the pre-shared key in the present embodiment will be described. FIG. 6 is a flowchart illustrating an example of the processing procedure of the present embodiment. This processing procedure illustrated in the flowchart in FIG. 6 is carried out at a predetermined timing, for example, at the timing when the ignition switch of the automobile V is turned on, the timing when the ignition switch of the automobile V is turned off, or the timing when a maintenance tool is connected to the GW 10 through the external input/output terminal of the GW 10 or the vehicle-mounted network system 1.

When the process is started, first of all, the error output unit 150 of the GW 10 sets the frequency counter to zero (step S101), and the determination unit 140 of the GW 10 sets the abnormality counter to zero (step S102).

Next, the generator 130 of the GW 10 selects a target group (step S103). The generator 130 then generates a session key to be distributed to ECUs 20 belonging to the selected target group and encrypts the session key using the pre-shared key corresponding to the target group to generate encrypted data (step S104). The generator 130 further generates verification data for the ECUs 20 to verify the correctness of the restored session key, based on the generated session key (step S105). The session key transmitter 121 of the GW 10 then transmits the encrypted data and the verification data generated by the generator 130, with addition of the group ID, onto the network (step S106).

The encrypted data and the verification data transmitted by the session key transmitter 121 of the GW 10 are received by the session key receiver 211 of an ECU 20 belonging to the target group (step S201). The verification unit 220 of the ECU 20 receiving the encrypted data and the verification data then decrypts the encrypted data received by the session key receiver 211, using the pre-shared key stored in the storage 230 to restore the session key distributed from the GW 10 (step S202). In addition, the verification unit 220 verifies whether the restored session key is correct, using the verification data received by the session key receiver 211 (step S203). The verification result transmitter 212 of the ECU 20 then transmits the verification result data indicating the result of verification by the verification unit 220 to the GW 10 (step S204).

The verification result data transmitted by the verification result transmitter 212 of the ECU 20 is received by the verification result receiver 122 of the GW 10 (step S107). When the verification result data is received by the verification result receiver 122, the determination unit 140 of the GW 10 determines whether the verification result indicated by the verification result data is Verification Failure (step S108). If the verification result is Verification Failure (Yes at step S108), the abnormality counter is incremented (step S109). If the verification result is Verification Success (No at step S108), the value of the abnormality counter is kept unchanged.

Next, the determination unit 140 determines whether all the groups have been selected as a target group (step S110). If there is any group not selected as a target group (No at step S110), the process returns to step S103 and the subsequent process repeats. If all the groups have been selected as a target group (Yes at step S110), the determination unit 140 confirms whether the value of the abnormality counter is zero (step S111). If the value of the abnormality counter is zero (Yes at step S111), there is no ECU 20 having abnormality in the pre-shared key, and the process ends.

If the value of the abnormality counter is not zero (No at step S111), the determination unit 140 determines whether the value of the abnormality counter is equal to or smaller than a first threshold (step S112). If the value of the abnormality counter is equal to or smaller than the first threshold (Yes at step S112), the error output unit 150 outputs a first error signal indicating that the ECU 20 side has abnormality (step S113), and the process ends.

If the value of the abnormality counter exceeds the first threshold (No at step S112), the error output unit 150 increments the frequency counter (step S114) and determines whether the value of the frequency counter reaches a second threshold (step S115). If the value of the frequency counter does not reach the second threshold (No at step S115), the error output unit 150 gives an instruction to retry. The process then returns to step S102 and the subsequent process repeats. If the value of the frequency counter reaches the second threshold (Yes at step S115), the error output unit 150 outputs a second error signal indicating that the GW 10 and/or the network has abnormality (step S116), and the process ends.

As described in details above with specific examples, in the vehicle-mounted network system 1 of the present embodiment, the GW 10 transmits encrypted data obtained by encrypting the session key using the pre-shared key and verification data for verifying whether the session key restored by the ECU 20 decrypting the encrypted data using the pre-shared key is correct, to the ECU 20. The GW 10 then receives verification result data indicating the result of verification of the correctness of the session key by the ECU 20 using the verification data, determines whether the pre-shared key stored in the ECU 20 is normal, based on the verification result data, and if it is determined that the pre-shared key is abnormal, outputs an error signal. In this way, the present embodiment enables appropriate testing of the pre-shared key stored in the ECU 20. If the pre-shared key stored in the ECU 20 is abnormal, an error signal is output to prompt, for example, the driver or the maintenance worker of the automobile V to take appropriate action.

According to the present embodiment, the GW 10 is configured to output a first error signal indicating that the ECU 20 side has abnormality when the number of ECUs 20 having the pre-shared key determined to be abnormal is equal to or smaller than the first threshold, and to output a second error signal indicating that the GW 10 and/or the network has abnormality when the number of ECUs 20 having the pre-shared key determined to be abnormal exceeds the first threshold. This configuration can prevent an error in the GW 10 or the network from being indicated as an error in the ECU 20.

According to the present embodiment, the GW 10 is configured to output a second error signal when the number of times the number of ECUs 20 having the pre-shared key determined to be abnormal exceeds the first threshold reaches the second threshold. This configuration can prevent abnormality of the GW 10 or the network from being indicated when proper testing fails to be performed due to a temporary failure of the network, that is, due to a failure to be recovered over time.

Modifications

In the first embodiment described above, when the verification data received from an ECU 20 is Verification Failure, the GW 10 determines that the pre-shared key stored in this ECU 20 is abnormal. Optionally, the GW 10 may be configured to specify, based on information about use environment of the ECU 20 having the pre-shared key determined to be abnormal, another ECU 20 having the pre-shared key likely to be abnormal. In this case, information about use environment of each ECU 20 is stored in, for example, the storage 110 of the GW 10. The GW 10 then specifies, based on the information about use environment of the ECU 20 having the pre-shared key determined to be abnormal, another ECU 20 used in a similar use environment, as an ECU 20 having the pre-shared key likely to be abnormal.

Specifically, for example, when information of position where an ECU 20 is disposed (position in the automobile V) is stored as information about use environment of the ECU 20, the GW 10 specifies another ECU 20 disposed near the ECU 20 having the pre-shared key determined to be abnormal (another ECU 20 disposed in the same area in the automobile V, or another ECU 20 with a distance equal to or smaller than a predetermined value) as an ECU 20 having the pre-shared key likely to be abnormal. When information about use conditions of an ECU 20 is stored as information about use environment of an ECU 20, the GW 10 specifies another ECU 20 having use conditions similar to those of the ECU 20 having the pre-shared key determined to be abnormal, as an ECU 20 having the pre-shared key likely to be abnormal. With this configuration, abnormality of the pre-shared key in the ECU 20 in question is detected before it occurs, and updating of the pre-shared key or repair or replacement of the ECU 20 can be performed.

In the example of the process processing of the present embodiment illustrated in FIG. 6, after it is determined that all the groups have been selected as a target group at step S110, the processing is performed in accordance with the value of the abnormality counter and the value of the frequency counter (step S111 to step S116). Alternatively, this processing may be performed on a group-by-group basis. More specifically, the GW 10 performs the processing at step S111 and the subsequent steps if No at step S108 or after step S109. The GW 10 then determines whether all the groups have been selected as a target group if Yes at step S111, after step S113, or after step S116. If all the groups have been selected as a target group, the process ends. Otherwise, the process returns to step S103 and the subsequent process repeats. With this processing, when the GW 10 and/or the network has abnormality, notification of such abnormality can be given without testing for all the groups.

In the foregoing first embodiment, when it is determined that the pre-shared key of an ECU 20 is abnormal, an error signal is output. Optionally, the pre-shared key of the group that an ECU 20 having the pre-shared key determined to be abnormal belongs to may be updated. In addition, when an ECU 20 having the pre-shared key likely to be abnormal is specified, the pre-shared key of the group that the specified ECU 20 belongs to may also be updated.

In updating of the pre-shared key, for example, the session key distributed by the GW 10 to each ECU 20 in the past and correctly restored and stored by the ECU 20 may be used in order that the GW 10 safely distributes the pre-shared key to the ECU 20. That is, in the foregoing first embodiment, since the pre-shared key is tested through distribution of a session key repeated at predetermined timings, the previous session keys are shared between the GW 10 and the ECU 20. That is, the ECU 20 stores the session keys correctly restored in the past. The GW 10 encrypts the newly generated pre-shared key using such a session key in the past and transmits the thus-obtained encrypted data (fourth data) to the ECU 20. The ECU 20 restores the pre-shared key newly generated by the GW 10, by decrypting the encrypted data received from the GW 10 using the session key in the past. The previous pre-shared key until determined to be abnormal is then updated with this new pre-shared key.

In the foregoing first embodiment, the GW 10 broadcasts encrypted data and verification data to be distributed to ECUs 20, with addition of the group ID, onto the network. Alternatively, transmission of encrypted data and verification data to ECUs 20 may be performed individually for each ECU 20 instead of such a group-by-group basis.

In the foregoing first embodiment, the pre-shared key stored in an ECU 20 is tested when the GW 10 distributes a session key to the ECU 20. However, embodiments are not limited to this. For example, the GW 10 may select any given data at random or according to a predetermined rule for determining whether the pre-shared key stored in an ECU 20 is normal, and transmit encrypted data obtained by encrypting this selected data using the pre-shared key and verification data generated based on this selected data to the ECU 20. In this case, the ECU 20 restores the given data selected by the GW 10 by decrypting the encrypted data received from the GW 10 using the pre-shared key stored in the ECU 20 itself and verifies whether the restored given data is correct, using the verification data received from the GW 10. Also in this case, whether the pre-shared key stored in the ECU 20 is normal can be determined based on whether the given data has been restored correctly in the ECU 20.

In the foregoing first embodiment, the target to be tested is the pre-shared key stored in an ECU 20. However, embodiments are not limited to this. The scheme as described above is widely applicable as a scheme for testing shared data, shared with the CW 10, that is stored in the ECU 20.

Second Embodiment

A second embodiment will now be described. The second embodiment differs from the foregoing first embodiment in that whether the session key restored by the ECU 20 is correct is verified on the GW 10 side. More specifically, in the first embodiment, verification is performed on the ECU 20 side based on the verification data generated by the GW 10, whereas in the present embodiment, whether the session key restored by the ECU 20 is correct is verified on the GW 10 side, based on the verification data generated by the ECU 20. In the following, the components common to the first embodiment are denoted with the same reference signs and an overlapping description is omitted as appropriate. Only the specific features of the present embodiment will be described. Hereinafter, the GW 10 of the present embodiment is denoted by GW 10A as distinguished from the first embodiment, and the ECU 20 of the present embodiment is denoted by ECU 20A as distinguished from the first embodiment.

Figure 7:
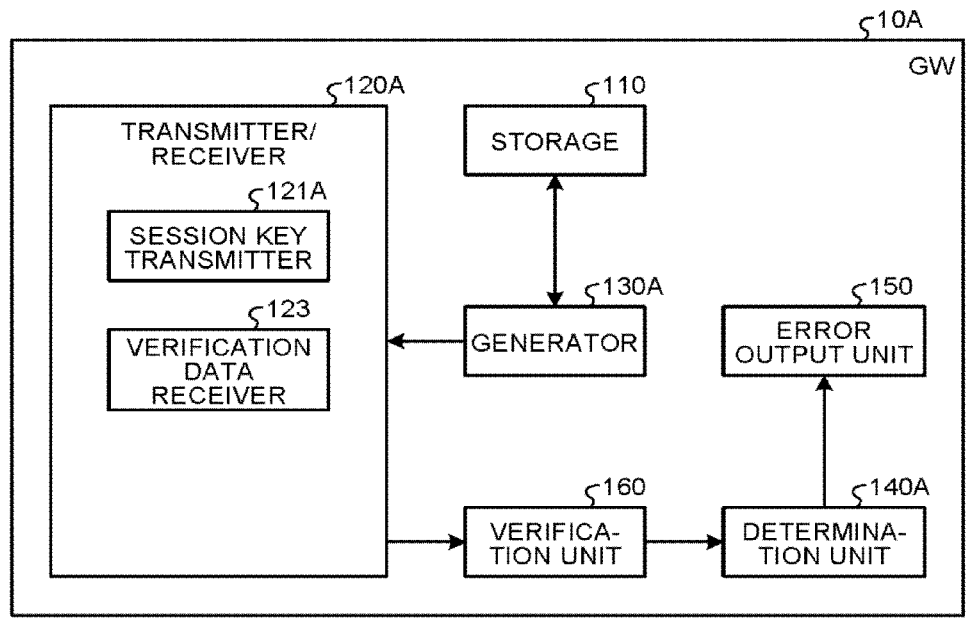
FIG. 7 is a block diagram illustrating a functional configuration example of the GW in a second embodiment.

FIG. 7 is a block diagram illustrating a functional configuration example of the GW 10A of the present embodiment. As illustrated in FIG. 7, the GW 10A of the present embodiment includes, for example, a storage 110, a transmitter/receiver 120A, a generator 130A, a verification unit 160, a determination unit 140A, and an error output unit 150 as functional components related to testing of the pre-shared key. Among those, the storage 110 and the error output unit 150 are common to the first embodiment and a description thereof is omitted.

The transmitter/receiver 120A is a module to allow the GW 10A to communicate with ECUs 20A through a network and includes a session key transmitter 121A and a verification data receiver 123 as submodules.

The session key transmitter 121A transmits encrypted data obtained by encrypting the session key to be distributed to an ECU 20A using the pre-shared key in the same manner as the session key transmitter 121 in the GW 10 in the first embodiment but does not transmit verification data.

The verification data receiver 123 receives verification data generated in the ECU 20A from the ECU 20A.

The generator 130A generates a session key to be distributed by the GW 10A to ECUs 20A and generates encrypted data by encrypting the session key using the pre-shared key shared with the ECUs 20A, in the same manner as in the generator 130 in the GW 10 in the first embodiment. However, the generator 130A of the present embodiment does not generate verification data for verifying whether the session key restored in the ECU 20A is correct. The encrypted data generated by the generator 130 is transmitted from the session key transmitter 121A to the ECU 20A.

The verification unit 160 verifies whether the session key restored by the ECU 20A is correct, using the verification data received by the verification data receiver 123 from the ECU 20A. Here, the verification data received by the verification data receiver 123 from the ECU 20A is, for example, the hash value of the session key restored by the ECU 20A or the value obtained by encrypting a predetermined value stored both in the GW 10A and the ECU 20A using the session key restored by the ECU 20A. When the hash value of the session key restored by the ECU 20A is used as verification data, the verification unit 160 calculates the hash value of the session key generated by the generator 130A and determines whether this calculated hash value is equal to the verification data received by the verification data receiver 123 from the ECU 20A to verify whether the session key restored by the ECU 20A is correct. When the value obtained by encrypting a predetermined value with the session key restored by the ECU 20A is used as verification data, the verification unit 160 encrypts the predetermined value using the session key generated by the generator 130A and determines whether the obtained value is equal to the verification data received by the verification data receiver 123 from the ECU 20A to verify whether the session key restored by the ECU 20A is correct.

The determination unit 140A determines whether the pre-shared key stored in the ECU 20A is normal, based on the result of verification by the verification unit 160. That is, if the result of verification by the verification unit 160 is Verification Success, that is, if the session key restored by the ECU 20A is correct, the determination unit 140A determines that the pre-shared key stored in the ECU 20A is normal. If the result of verification by the verification unit 160 is Verification Failure, that is, if the session key restored by the ECU 20A is not correct, the determination unit 140A determines that the pre-shared key stored in the ECU 20A is abnormal. The determination unit 140A of the present embodiment is similar to the determination unit 140 in the foregoing first embodiment, except that whether the pre-shared key stored in the ECU 20A is normal is determined based on the result of verification by the verification unit 160.

Figure 8:
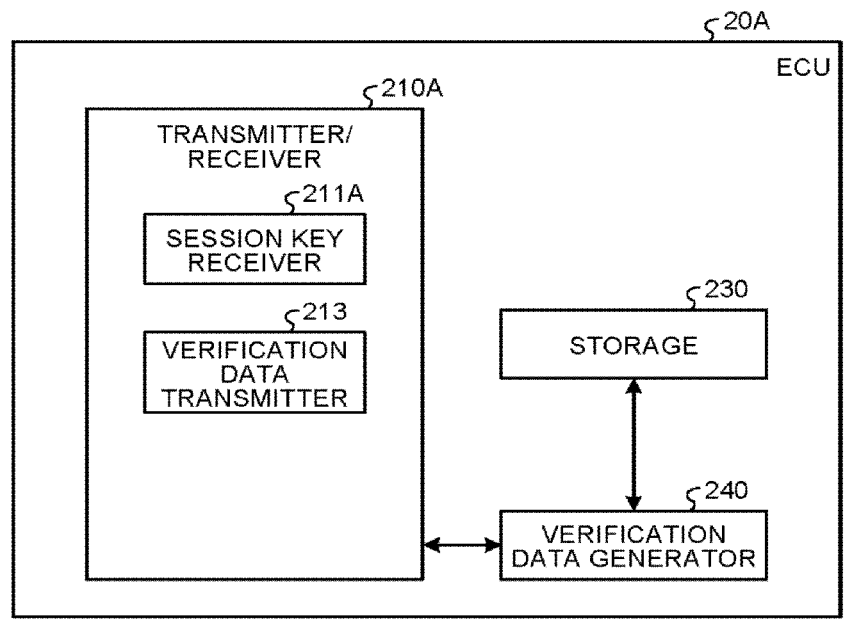
FIG. 8 is a block diagram illustrating a functional configuration example of the ECU in the second embodiment.

An overview of the ECU 20A of the present embodiment will now be described. FIG. 8 is a block diagram illustrating a functional configuration example of the ECU 20A of the present embodiment. As illustrated in FIG. 8, the ECU 20A of the present embodiment includes, for example, a transmitter/receiver 210A, a storage 230, and a verification data generator 240 as functional components related to testing of the pre-shared key. Among those, the storage 230 is common to the first embodiment and a description thereof is omitted.

The transmitter/receiver 210A is a module to allow the ECU 20A to communicate with the GW 10A through a network and includes a session key receiver 211A and a verification data transmitter 213 as submodules.

The session key receiver 211A receives the encrypted data transmitted by the GW 10A in the same manner as the session key receiver 211 in the ECU 20 in the first embodiment, but does not receive verification data, which is not transmitted from the GW 10A.

The verification data transmitter 213 transmits the verification data generated by the verification data generator 240 to the GW 10A.

The verification data generator 240 decrypts the encrypted data received by the session key receiver 211A using the pre-shared key stored in the storage 230 to restore the session key distributed by the GW 10A. The verification data generator 240 then generates the hash value of the restored session key or the value obtained by encrypting a predetermined value with the restored session key, as verification data for verifying whether the restored session key is correct. The verification data generated by the verification data generator 240 is transmitted from the verification data transmitter 213 to the GW 10A.

Figure 9:
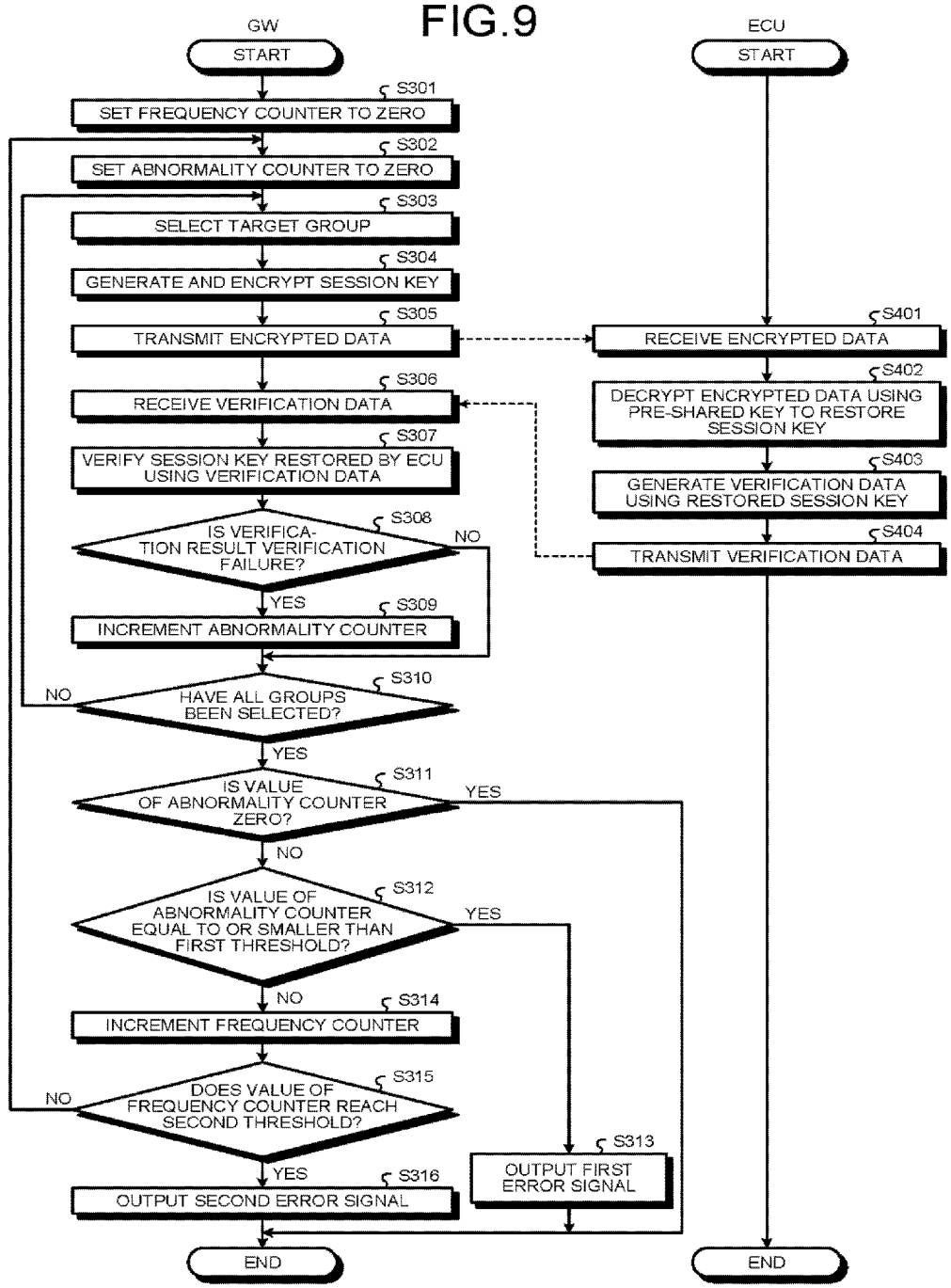
FIG. 9 is a flowchart illustrating an example of the processing procedure in the second embodiment.

Referring now to FIG. 9, an operational example of the GW 10A and the ECU 20A related to testing of the pre-shared key in the present embodiment will be described. FIG. 9 is a flowchart illustrating an example of the processing procedure in the present embodiment. This processing procedure illustrated in the flowchart in FIG. 9 is carried out at a predetermined timing, for example, at the timing when the ignition switch of the automobile V is turned on, the timing when the ignition switch of the automobile V is turned off, or the timing when a maintenance tool is connected to the GW 10A through the external input/output terminal of the GW 10A or the vehicle-mounted network system 1.

When the process is started, first of all, the error output unit 150 of the GW 10A sets the frequency counter to zero (step S301) and the determination unit 140A of the GW 10A sets the abnormality counter to zero (step S302).

Next, the generator 130A of the GW 10A selects a target group (step S303). The generator 130A then generates a session key to be distributed to ECUs 20A belonging to the selected target group and encrypts the session key using the pre-shared key corresponding to the target group to generate encrypted data (step S304). The session key transmitter 121A of the GW 10A then transmits the encrypted data generated by the generator 130A, with addition of the group ID, onto the network (step S305).

The encrypted data transmitted by the session key transmitter 121A of the GW 10A is received by the session key receiver 211A of an ECU 20A belonging to the target group (step S401). The verification data generator 240 of the ECU 20A receiving the encrypted data then decrypts the encrypted data received by the session key receiver 211A using the pre-shared key stored in the storage 230 to restore the session key distributed from the GW 10A (step S402). The verification data generator 240 further generates verification data for verifying whether this session key is correct, based on the restored session key (step S403). The verification data transmitter 213 of the ECU 20A then transmits the verification data generated by the verification data generator 240 to the GW 10A (step S404).

The verification data transmitted by the verification data transmitter 213 of the ECU 20A is then received by the verification data receiver 123 of the GW 10A (step S306). The verification unit 160 of the GW 10A then verifies whether the session key restored by the ECU 20A is correct, using the verification data received by the verification data receiver 123 (step S307). The determination unit 140A of the GW 10A determines whether the result of verification by the verification unit 160 is Verification Failure (step S308). If the verification result is Verification Failure (Yes at step S308), the abnormality counter is incremented (step S309). If the verification result is Verification Success (No at step S308), the value of the abnormality counter is kept unchanged.

Next, the determination unit 140A determines whether all the groups have been selected as a target group (step S310). If there is any group not selected as a target group (No at step S310), the process returns to step S303 and the subsequent process repeats. If all the groups have been selected as a target group (Yes at step S310), the determination unit 140A confirms whether the value of the abnormality counter is zero (step S311). If the value of the abnormality counter is zero (Yes at step S311), there is no ECU 20A having an abnormal pre-shared key, and the process ends.

If the value of the abnormality counter is not zero (No at step S311), the determination unit 140A determines whether the value of the abnormality counter is equal to or smaller than a first threshold (step S312). If the value of the abnormality counter is equal to or smaller than the first threshold (Yes at step S312), the error output unit 150 outputs a first error signal indicating that the ECU 20A side has abnormality (step S313), and the process ends.

If the value of the abnormality counter exceeds the first threshold (No at step S312), the error output unit 150 increments the frequency counter (step S314) and determines whether the value of the frequency counter reaches a second threshold (step S315). If the value of the frequency counter does not reach the second threshold (No at step S315), the error output unit 150 gives an instruction to retry. The process then returns to step S302 and the subsequent process repeats. If the value of the frequency counter reaches the second threshold (Yes at step S315), the error output unit 150 outputs a second error signal indicating that the GW 10A and/or the network has abnormality (step S316), and the process ends.

As described in details above with specific examples, in the vehicle-mounted network system 1 of the present embodiment, the GW 10A transmits encrypted data obtained by encrypting the session key using the pre-shared key to an ECU 20A. The GW 10A then receives the verification data for verifying whether the session key restored by the ECU 20A is correct, from the ECU 20A, and verifies whether the session key restored by the ECU 20A is correct, using this verification data. Then whether the pre-shared key stored in the ECU 20A is normal is determined based on the verification result. If it is determined that the pre-shared key is abnormal, an error signal is output. According to the present embodiment, the pre-shared key stored in the ECU 20A is appropriately tested in the same manner as in the first embodiment, and if the pre-shared key stored in the ECU 20A is abnormal, an error signal is output to prompt, for example, the driver or the maintenance worker of the automobile V to take appropriate action.

Modifications

All the modifications to the first embodiment as described above can also be applied as modifications to the present embodiment.

Third Embodiment

A third embodiment will now be described. The third embodiment differs from the foregoing first embodiment in that each ECU 20 connected as a node of the vehicle-mounted network system 1 to the network is equipped with a physically unclonable function (PUF) for outputting unit-specific data and generates a session key shared between ECUs 20 using output data of the PUF that is unit-specific data (hereinafter referred to as "PUF output"). Although PUF output is data specific to each ECU 20, a shared key such as a session key shared between ECUs 20 can be generated from PUF output using data (hereinafter referred to as "auxiliary data") adjusted so as to smooth out the differences of PUF output among ECUs 20.

In the present embodiment, it is assumed that the GW 10 stores the PUF output of each ECU 20. That is, the GW 10 shares the PUF output with each ECU 20. It is assumed that when transmitting auxiliary data for each ECU 20 to generate a session key from the PUF output to each ECU 20, the GW 10 tests whether the PUF output that is data specific to the ECU 20 is normal. In the present embodiment, the PUF output of each ECU 20 that is stored in the GW 10 corresponds to "first data", a session key generated by each ECU 20 from the PUF output corresponds to "second data", and auxiliary data used for generating a session key from the PUF output corresponds to "third data". In the following, the components common to the first embodiment or the second embodiment are denoted with the same reference signs and an overlapping description thereof is omitted as appropriate. Only the specific features of the present embodiment will be described. Hereinafter, the GW 10 of the present embodiment is denoted by GW 10B as distinguished from the first embodiment and the second embodiment, and the ECU 20 of the present embodiment is denoted by ECU 20B as distinguished from the first embodiment and the second embodiment.

Figure 10:
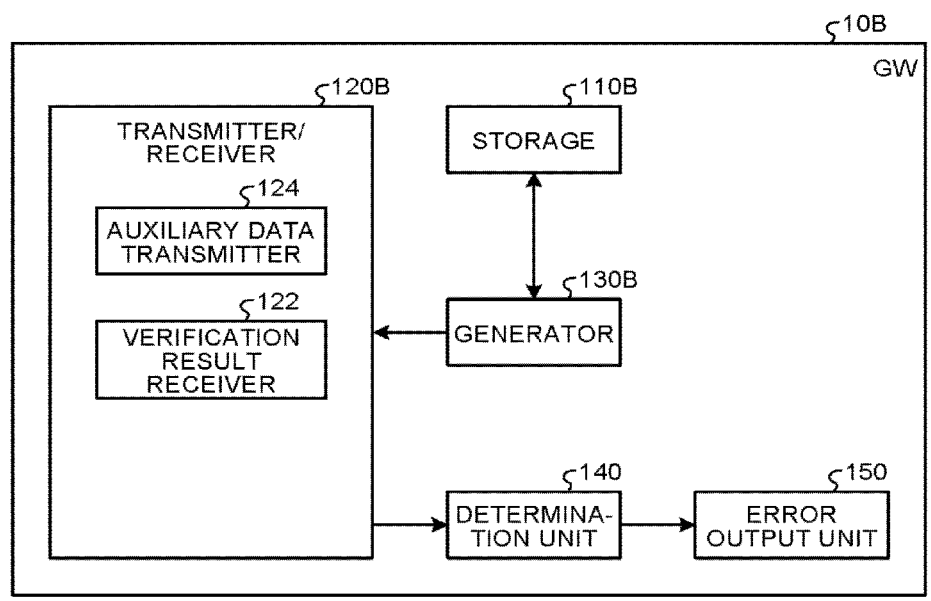
FIG. 10 is a block diagram illustrating a functional configuration example of the GW in a third embodiment.

FIG. 10 is a block diagram illustrating a functional configuration example of the GW 10B of the present embodiment. As illustrated in FIG. 10, the GW 10B of the present embodiment includes, for example, a storage 110B, a transmitter/receiver 120B, a generator 130B, a determination unit 140, and an error output unit 150 as functional components related to testing of PUF output. Among those, the determination unit 140 and the error output unit 150 are common to the first embodiment, except that PUF output is tested as a target in place of the pre-shared key, and a description thereof is omitted.

The storage 110B stores, in place of the group management information stored in the storage 110 in the first embodiment, PUF output that is data specific to each ECU 20B in association with, for example, the device ID of each ECU 20B or the group ID of the group that each ECU 20B belongs to. It is assumed that the specific data of each ECU 20B is stored in the storage 110B in advance.

The transmitter/receiver 120B is a module to allow the GW 10B to communicate with ECUs 20B through a network and includes an auxiliary data transmitter 124 and a verification result receiver 122 as submodules. Among those, the verification result receiver 122 is common to the first embodiment, and a description thereof is omitted.

The auxiliary data transmitter 124 transmits auxiliary data generated by the generator 130B for each ECU 20B, that is, auxiliary data used for generating a session key from the PUF output in each ECU 20B, and verification data for verifying the correctness of the session key generated by the ECU 20B using the PUF output and the auxiliary data, to each ECU 20B.

The generator 130B generates a session key to be distributed to ECUs 20B for each group and generates auxiliary data for each ECU 20B to be used for generating a session key from the PUF output in the ECU 20B, based on the PUF output of each ECU 20B stored in the storage 110B and the generated session key. The generator 130B then generates verification data for verifying the correctness of the session key generated by the ECU 20B using the PUF output and the auxiliary data. The auxiliary data and the verification data generated by the generator 130B are transmitted from the auxiliary data transmitter 124 to each ECU 20B.

For example, the hash value of the session key or the value obtained by encrypting a predetermined value stored in both the GW 10B and the ECU 20B with the session key can be used as verification data, as in the first embodiment. When the hash value of the session key is used as verification data, the ECU 20B calculates the hash value of the session key generated using its own PUF output and the auxiliary data and can determine whether the calculated hash value is equal to the hash value transmitted from the GW 10B to verify whether the session key generated using the PUF output and the auxiliary data is correct. When the value obtained by encrypting a predetermined value with the session key is used as verification data, the ECU 20B encrypts a predetermined value using the session key generated using its own PUF output and the auxiliary data and can determine whether the obtained value is equal to the value transmitted from the GW 10B to verify whether the session key generated using the PUF output and the auxiliary data is correct.

Figure 11:
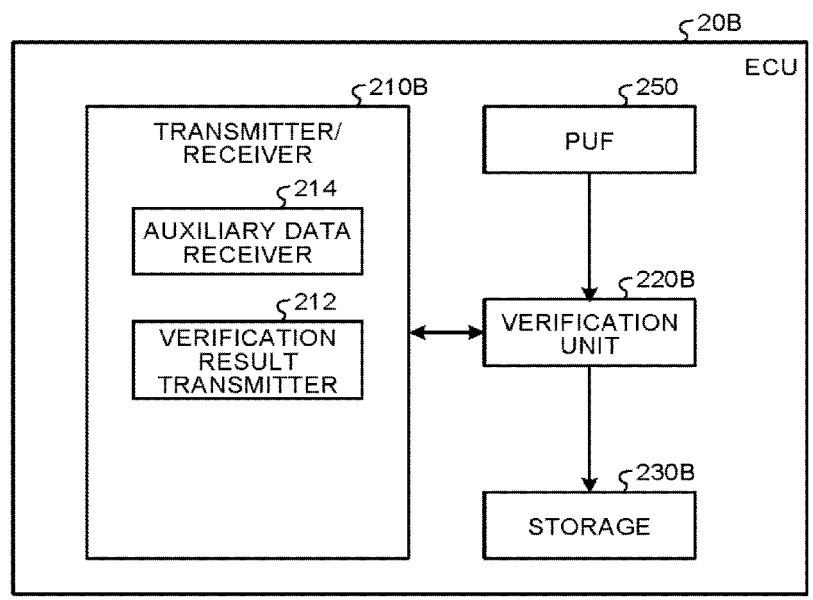
FIG. 11 is a block diagram illustrating a functional configuration example of the ECU in the third embodiment.

An overview of the ECU 20B of the present embodiment will now be described. FIG. 11 is a block diagram illustrating a functional configuration example of the ECU 20B of the present embodiment. As illustrated in FIG. 11, the ECU 20B of the present embodiment includes, for example, a transmitter/receiver 210B, a verification unit 220B, a storage 230B, and a PUF 250 as functional components related to testing of PUF output.

The transmitter/receiver 210B is a module to allow the ECU 20B to communicate with the GW 10B through a network and includes an auxiliary data receiver 214 and a verification result transmitter 212 as submodules. Among those, the verification result transmitter 212 is common to the first embodiment, and a description thereof is omitted.

The auxiliary data receiver 214 receives the auxiliary data and the verification data transmitted by the auxiliary data transmitter 124 of the GW 10B.

The verification unit 220B acquires the PUF output from the PUF 250 and generates a session key using the acquired PUF output and the auxiliary data received by the auxiliary data receiver 214. That is, the verification unit 220B restores the session key generated by the generator 130B of the GW 10B using the PUF output acquired from the PUF 250 and the auxiliary data. The verification unit 220B then verifies whether the restored session key is correct using the verification data received by the auxiliary data receiver 214. If the restored session key is correct, the verification unit 220B stores the auxiliary data received by the auxiliary data receiver 214 into the storage 230B. The verification unit 220B also notifies the transmitter/receiver 210B of the result of verification of the correctness of the session key restored using the PUF output and the auxiliary data. The verification result data indicating the result of verification by the verification unit 220B is thus transmitted from the verification result transmitter 212 to the GW 10B.

The storage 230B stores, for example, the session key determined to be correct through verification by the verification unit 220B. Once auxiliary data is stored into the storage 230B, thereafter the ECU 20B can generate a session key using the PUF output acquired from the PUF 250 and the auxiliary data stored in the storage 230B when communicating with another ECU 20B belonging to the same group.

Referring now to FIG. 12, an operational example of the GW 10B and the ECU 20B related to testing of PUF output in the present embodiment will be described. FIG. 12 is a flowchart illustrating an example of the processing procedure in the present embodiment. This processing procedure illustrated in the flowchart in FIG. 12 is carried out at a predetermined timing, for example, at the timing when the ignition switch of the automobile V is turned on, the timing when the ignition switch of the automobile V is turned off, or the timing when a maintenance tool is connected to the GW 10B through the external input/output terminal of the GW 10B or the vehicle-mounted network system 1.

When the process is started, first of all, the error output unit 150 of the GW 10B sets the frequency counter to zero (step S501), and the determination unit 140 of the GW 10B sets the abnormality counter to zero (step S502).

Next, the generator 130B of the GW 10B selects a target group (step S503). The generator 130B then generates a session key to be distributed to ECUs 20B belonging to the selected target group and generates auxiliary data corresponding to each ECU 20B, based on the PUF output of each ECU 20B stored in the storage 110B and the generated session key (step S504). The generator 130B further generates verification data for verifying the correctness of the session key generated by the ECU 20B using the PUF output and the auxiliary data, based on the generated session key (step S505). The auxiliary data transmitter 124 of the GW 10B then transmits the auxiliary data and the verification data generated by the generator 130B to each ECU 20B (step S506).

The auxiliary data and the verification data transmitted by the auxiliary data transmitter 124 of the GW 10B are then received by the auxiliary data receiver 214 of each ECU 20B (step S601). The verification unit 220B of the ECU 20B receiving the auxiliary data and the verification data then acquires the PUF output from the PUF 250 (step S602) and generates a session key using the acquired PUF output and the auxiliary data received by the auxiliary data receiver 214 (step S603). The verification unit 220B further verifies whether the generated session key is correct, using the verification data received by the auxiliary data receiver 214 (step S604). The verification result transmitter 212 of the ECU 20B then transmits the verification result data indicating the result of verification by the verification unit 220B to the GW 10B (step S605).

The verification result data transmitted by the verification result transmitter 212 of the ECU 20B is received by the verification result receiver 122 of the GW 10B (step S507). When the verification result receiver 122 receives the verification result data, the determination unit 140 of the GW 10B determines whether the verification result indicated by the verification result data is Verification Failure (step S508). If the verification result is Verification Failure (Yes at step S508), the abnormality counter is incremented (step S509). If the verification result is Verification Success (No at step S508), the value of the abnormality counter is kept unchanged.

Next, the determination unit 140 determines whether all the groups have been selected as a target group (step S510). If there is any group not selected as a target group (No at step S510), the process returns to step S503 and the subsequent process repeats. If all the groups have been selected as a target group (Yes at step S510), the determination unit 140 confirms whether the value of the abnormality counter is zero (step S511). If the value of the abnormality counter is zero (Yes at step S511), there is no ECU 20B having an abnormal pre-shared key, and the process ends.

If the value of the abnormality counter is not zero (No at step S511), the determination unit 140 determines whether the value of the abnormality counter is equal to or smaller than a first threshold (step S512). If the value of the abnormality counter is equal to or smaller than the first threshold (Yes at step S512), the error output unit 150 outputs a first error signal indicating that the ECU 20B side has abnormality (step S513), and the process ends.

If the value of the abnormality counter exceeds the first threshold (No at step S512), the error output unit 150 increments the frequency counter (step S514) and determines whether the value of the frequency counter reaches a second threshold (step S515). If the value of the frequency counter does not reach the second threshold (No at step S515), the error output unit 150 gives an instruction to retry. The process then returns to step S502 and the subsequent process repeats. If the value of the frequency counter reaches the second threshold (Yes at step S515), the error output unit 150 outputs a second error signal indicating that the GW 10B and/or the network has abnormality (step S516), and the process ends.

As described in details above with specific examples, in the vehicle-mounted network system 1 of the present embodiment, the GW 10B transmits auxiliary data used for generating a session key from the PUF output in the ECU 20B and verification data for verifying whether the session key generated by the ECU 20B using the PUF output and the auxiliary data is correct, to the ECU 20B. The GW 10B then receives verification result data indicating the result of verification of the correctness of the session key by the ECU 20B using the verification data, determines whether the PUF output that is data specific to the ECU 20B is normal, based on the received verification result data, and if it is determined that the PUF output is abnormal, outputs an error signal. According to the present embodiment, the PUF output that is data specific to each ECU 20B is tested appropriately, and if the PUF output of the ECU 20B is abnormal, an error signal is output to prompt, for example, the driver or the maintenance worker of the automobile V to take appropriate action.

In particular, in the present embodiment, the ECU 20B is configured not to store the session key but to store auxiliary data used for generating a session key from the PUF output. This configuration reduces the risk of leakage of session shared keys due to fraud attacks to the ECUs 20B and can provide the safer vehicle-mounted network system 1.

Modifications

In the foregoing third embodiment, if the verification data received from an ECU 20B is Verification Failure, the GW 10B determines that the PUF output that is data specific to this ECU 20B is abnormal. Optionally, the GW 10B may be configured to specify, based on information about use environment of the ECU 20B having the PUF output determined to be abnormal, another ECU 20B having the PUF output likely to be abnormal. In this case, the information about use environment of each ECU 20B is stored in, for example, the storage 110B of the GW 10B. The GW 10B then specifies, based on the information about use environment of the ECU 20B having the PUF output determined to be abnormal, another ECU 20B being used in a similar use environment, as an ECU 20B having the PUF output likely to be abnormal. With this configuration, abnormality of the PUF output in the ECU 20B in question can be detected before it happens, and repair or replacement of the ECU 20B in question can be performed.

In the foregoing third embodiment, an error signal is output when it is determined that the PUF output of the ECU 20B is abnormal. Optionally, a new PUF output of the ECU 20B having the PUF output determined to be abnormal, for example, a new PUF output that is output using an area different from the area suspected to have a failure in the PUF 250, may be transmitted to the GW 10B, so that the PUF output of the ECU 20B in question that is stored in the GW 10B is updated with the new PUF output. In order to safely transmit this new PUF output from the ECU 20B to the GW 10B, the session key in the past shared between the GW 10B and the ECU 20B may be used.

In the foregoing third embodiment, the GW 10B tests the PUF output that is data specific to each ECU 20B when distributing a session key to ECUs 20B. However, embodiments are not limited to this. For example, the GW 10B may select any given data for determining whether the PUF output of each ECU 20B is normal, at random or according to a predetermined rule, and transmit computation result data computed from the PUF output data of the GW 10B stored in the ECU 20B and the selected data, and verification data generated based on the selected data, to the ECU 20B. In this case, the ECU 20B restores the given data selected by the GW 10B based on its own PUF output and the computation result data received from the GW 10B and verifies whether the restored given data is correct, using the verification data received from the GW 10B. Also in this case, whether the PUF output of an ECU 20B is normal can be determined based on whether any given data has been restored correctly in the ECU 20B.

In the foregoing third embodiment, the verification as to whether the session key generated by the ECU 20B using the PUF output and the auxiliary data is correct is performed on the ECU 20B side, as in the first embodiment. However, the verification may be performed on the GW 10B side, as in the second embodiment.

In the example of the processing procedure of the present embodiment illustrated in FIG. 12, after it is determined that all the groups have been selected as a target group at step S510, the processing is performed in accordance with the value of the abnormality counter and the value of the frequency counter (step S511 to step S516). Alternatively, this processing may be performed on a group-by-group basis, as in the modification to the first embodiment.

Supplementary Description

The functions of the GWs 10, 10A, and 10B mentioned above can be implemented, for example, through cooperation of the hardware illustrated in FIG. 2 with software. In this case, the microcontroller 12 executes the control under instructions of a program provided as software while using the network I/F 11, thereby implementing the functional components mentioned above.

The program implementing the functional components of the GWs 10, 10A, and 10B is, for example, built in a memory area in the microcontroller 12 in advance. The program may be recorded in a file in an installable format or an executable format on a computer-readable recording medium such as a compact disc read only memory (CD-ROM), a flexible disk (FD), a compact disc recordable (CD-R), and a digital versatile disc (DVD). The program may be configured to be stored in a computer connected to a network such as the Internet and downloaded via the network. The program may be configured so as to be provided or distributed via a network such as the Internet. Some or all of the aforementioned functional components of the GWs 10, 10A, and 10B may be implemented using dedicated hardware such as application specific integrated circuit (ASIC) and field programmable gate array (FPGA).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A test apparatus that is connected to an electronic device through a network, the apparatus comprising:
   circuitry configured to function as:
      a generator configured to generate third data computed from first data shared with the electronic device and predetermined second data;
      a transmitter configured to transmit the third data to the electronic device;
      a receiver configured to receive, from the electronic device, verification data for verifying correctness of the second data restored by the electronic device;
      a verification unit configured to verify correctness of the second data restored by the electronic device using the verification data,
      a determination unit configured to determine whether the first data of the electronic device is normal based on a result of verification performed by the verification unit; and
      an error output unit, wherein
   the determination unit determines whether the first data is normal for each of a plurality of electronic devices connected to the network, and the error output unit outputs a first error signal when the number of electronic devices having the first data determined to be abnormal is equal to or smaller than a first threshold, and outputs a second error signal when the number of electronic devices having the first data determined to be abnormal exceeds the first threshold, the first error signal indicating that the electronic devices have abnormality, the second error signal indicating that there is an abnormality other than in the electronic devices, the abnormality including an abnormality in the test apparatus or the network.

2. The apparatus according to claim 1, wherein when the number of electronic devices having the first data determined to be abnormal exceeds the first threshold, the error output unit gives an instruction to repeat transmission of the third data by the transmitter and determination by the determination unit until the number of times the number of electronic devices having the first data determined to be abnormal exceeds the first threshold reaches a second threshold, and outputs the second error signal when the number of times the number of electronic devices having the first data determined to be abnormal exceeds the first threshold reaches the second threshold.

3. The apparatus according to claim 1, in a case of a plurality of the electronic devices connected to the network store therein the first data in common, the transmitter transmits the third data in common to the electronic devices that store therein the first data in common.

4. The apparatus according to claim 1, wherein, based on information about use environment of the electronic device having the first data determined to be abnormal, another electronic device having the first data likely to be abnormal is specified.

5. The apparatus according to claim 1, wherein when the first data of the electronic device is determined to be abnormal, the generator newly generates the first data shared with the electronic device and generates fourth data obtained by encrypting the newly generated first data using the second data correctly restored and stored by the electronic device in past, and when the first data of the electronic device is determined to be abnormal, the transmitter transmits the fourth data to the electronic device.

6. The apparatus according to claim 1, wherein the first data is a pre-shared key shared between a plurality of the electronic devices connected to the network, the second data is a session key derived from the pre-shared key, and the third data is encrypted data obtained by encrypting the session key using the pre-shared key.

7. The apparatus according to claim 1, wherein the first data is output data of a physically unclonable function of the electronic device, the second data is a session key generated using the output data of the physically unclonable function, and the third data is auxiliary data used for generating the session key from the output data of the physically unclonable function.

8. A communication system comprising:
a test apparatus; and
an electronic device connected to the test apparatus through a network, wherein
the test apparatus comprises:
circuitry configured to function as:
a generator configured to generate third data computed from first data shared with the electronic device and predetermined second data;
a transmitter configured to transmit the third data to the electronic device;
a receiver configured to receive, from the electronic device, verification data for verifying correctness of the second data restored by the electronic device;
a verification unit configured to verify correctness of the second data restored by the electronic device using the verification data;
a determination unit configured to determine whether the first data of the electronic device is normal based on a result of verification performed by the verification unit; and
an error output unit, wherein
the determination unit determines whether the first data is normal for each of a plurality of electronic devices connected to the network, and
the error output unit outputs a first error signal when the number of electronic devices having the first data determined to be abnormal is equal to or smaller than a first threshold, and outputs a second error signal when the number of electronic devices having the first data determined to be abnormal exceeds the first threshold, the first error signal indicating that the electronic devices have abnormality, the second error signal indicating that something other than the electronic devices, such as the test apparatus or the network, has abnormality.

9. A test method performed by a test apparatus that is connected to an electronic device through a network, the method comprising:
generating third data computed from first data shared with the electronic device and predetermined second data;
transmitting the third data to the electronic device;
receiving, from the electronic device, verification data for verifying correctness of the second data restored by the electronic device;
verifying correctness of the second data restored by the electronic device using the verification data;
determining whether the first data of the electronic device is normal based on a result of the verification; and
outputting an error signal, wherein
the determining determines whether the first data is normal for each of a plurality of electronic devices connected to the network, and
the outputting outputs a first error signal when the number of electronic devices having the first data determined to be abnormal is equal to or smaller than a first threshold, and the outputting outputs a second error signal when the number of electronic devices having the first data determined to be abnormal exceeds the first threshold, the first error signal indicating that the electronic devices have abnormality, the second error signal indicating that something other than the electronic devices, such as the test apparatus or the network, has abnormality.

* * * * *